United States Patent
Cathenaut et al.

(10) Patent No.: US 6,543,248 B2
(45) Date of Patent: Apr. 8, 2003

(54) APPARATUS FOR MOLDING FROZEN CONFECTIONERY COMPOSITIONS INTO ARTICLES

(75) Inventors: Philip Igor Cathenaut, Beauvais (FR); Bruno Delande, Marseille en Beauvaisis (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/796,573

(22) Filed: Feb. 28, 2001

(65) Prior Publication Data

US 2001/0009097 A1 Jul. 26, 2001

Related U.S. Application Data

(62) Division of application No. 09/310,390, filed on May 12, 1999, now abandoned.

(30) Foreign Application Priority Data

May 13, 1998 (EP) ............................................. 98201562

(51) Int. Cl.[7] ................................................. A23G 9/00
(52) U.S. Cl. .......................... 62/345; 425/448; 425/449
(58) Field of Search ........................... 62/345; 425/449, 425/448, 560

(56) References Cited

U.S. PATENT DOCUMENTS

| | | | |
|---|---|---|---|
| 1,801,578 A | 4/1931 | Stevens | |
| 3,437,722 A | * 4/1969 | Cronin et al. | 264/48 |
| 3,632,245 A | 1/1972 | Getman | 425/13 |
| 4,188,768 A | * 2/1980 | Getman | 426/282 |
| 4,477,473 A | 10/1984 | Schoonmaker et al. | 426/231 |
| 4,566,612 A | 1/1986 | von Kreuter | 222/309 |
| 4,648,829 A | 3/1987 | Cattani | 425/326.1 |
| 4,659,575 A | * 4/1987 | Fiedler | 261/121.1 |
| 5,172,835 A | 12/1992 | Hudcovic et al. | 222/380 |
| 5,464,120 A | 11/1995 | Alpers et al. | 222/1 |
| 5,718,354 A | 2/1998 | Binley | 222/1 |
| 5,738,895 A | 4/1998 | Fuchs et al. | 426/515 |
| 6,006,535 A | * 12/1999 | Cathenaut | 425/134 |

* cited by examiner

Primary Examiner—William E. Tapolcal
Assistant Examiner—Mohammad M. Ali
(74) Attorney, Agent, or Firm—Winston & Strawn

(57) ABSTRACT

The device for moulding frozen confectionery articles comprises a metering hopper connected to a volumetric metering device comprising a metering chamber and a metering element dispensing a predetermined volume of ice cream into passing containers by means of a metering nozzle.

As the hopper is pressurized, the metering chamber is filled without the formation of air pockets in the aspiration phase, which makes it possible to manufacture moulded articles of hard ice cream.

25 Claims, 2 Drawing Sheets

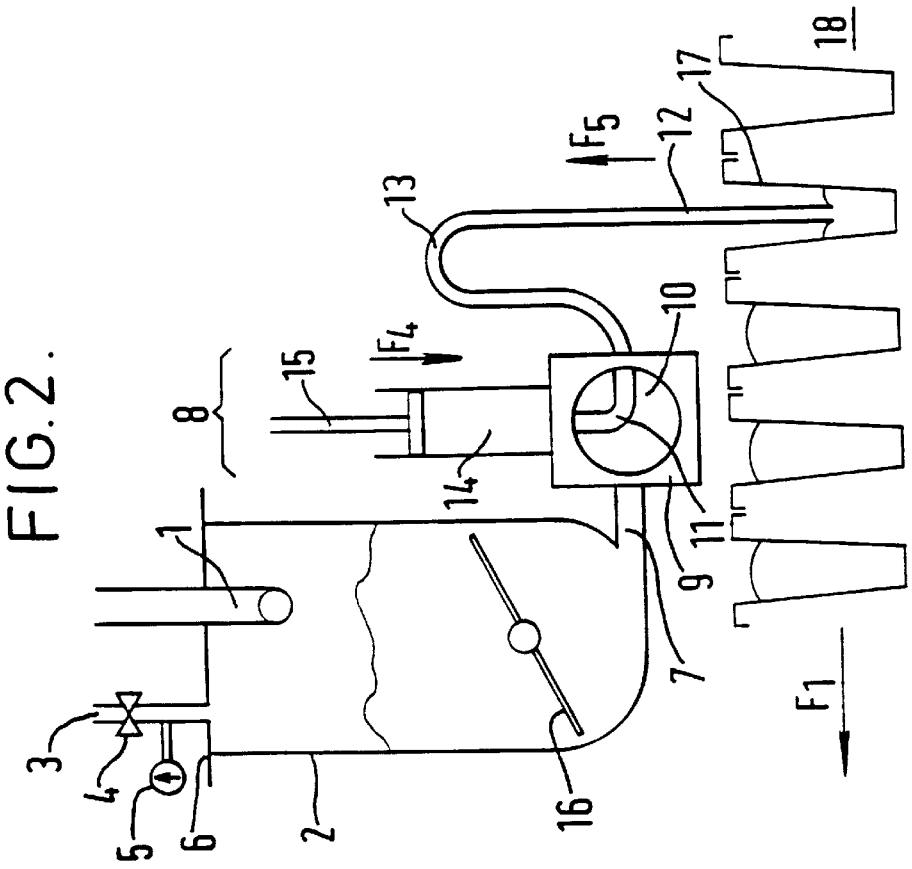
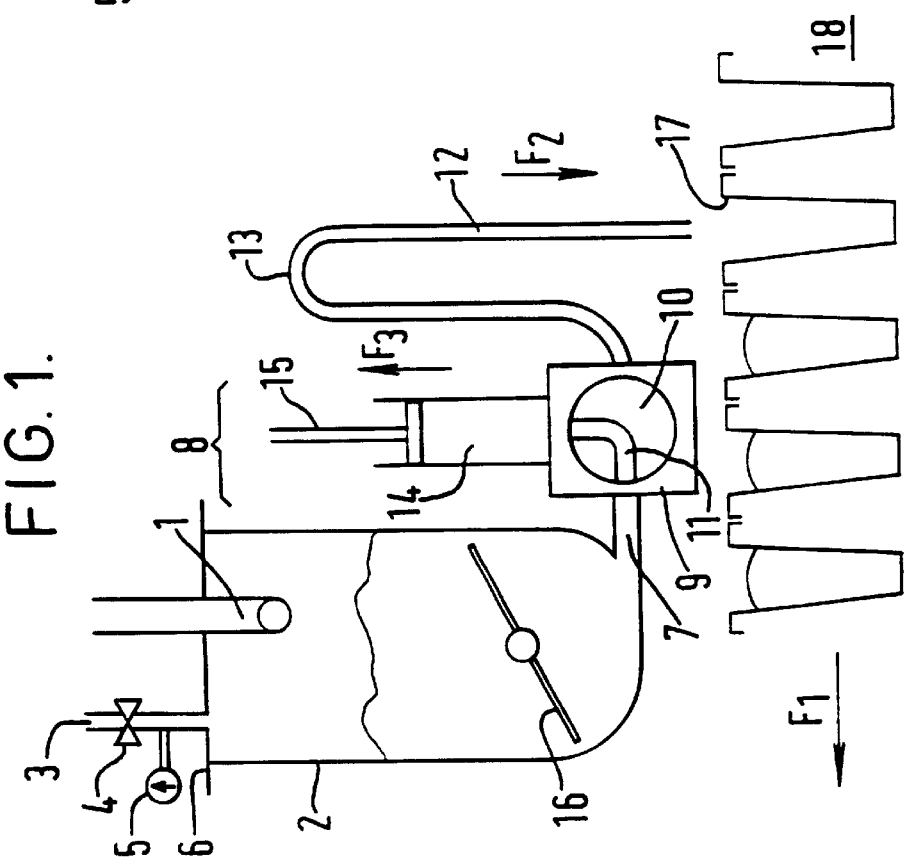

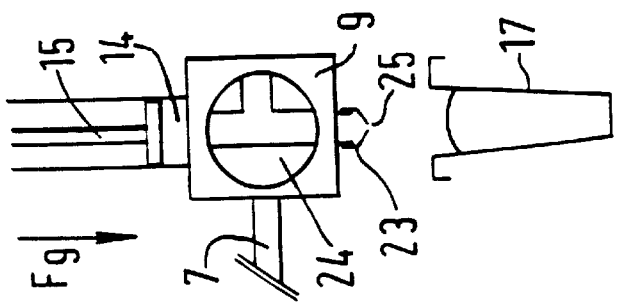
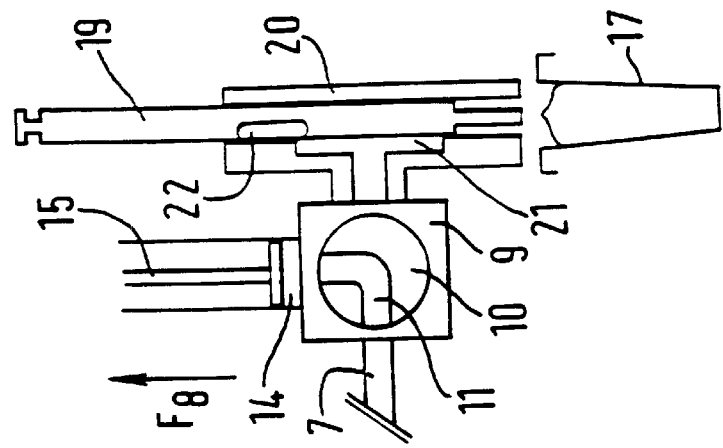
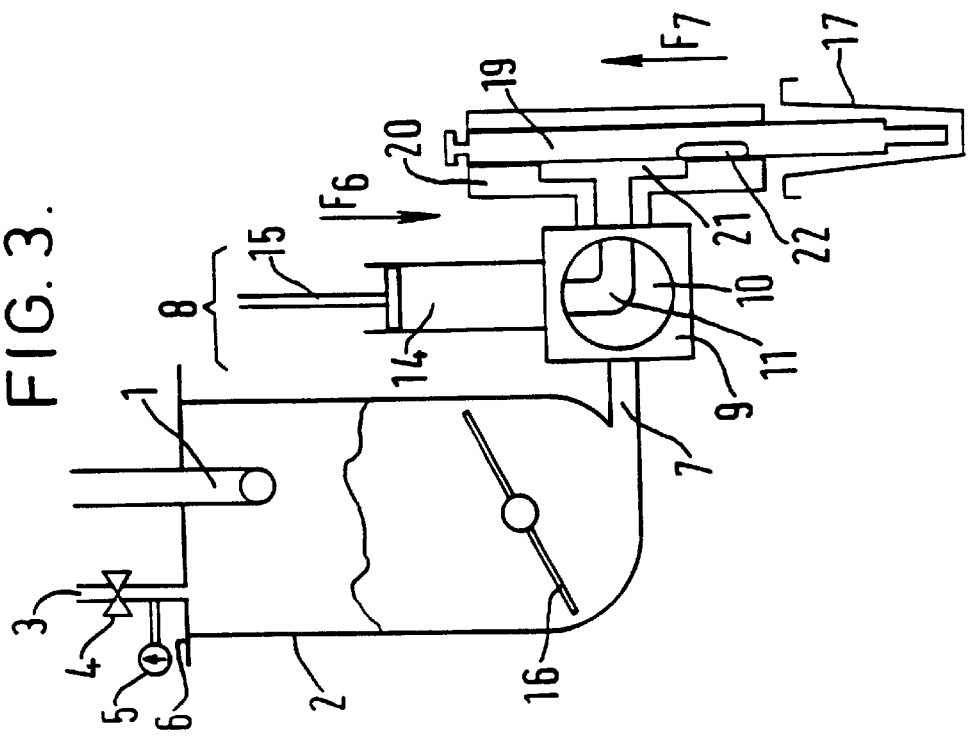

APPARATUS FOR MOLDING FROZEN CONFECTIONERY COMPOSITIONS INTO ARTICLES

This is a division of application Ser. No. 09/310,390, filed May 12, 1999, now abandoned.

The invention relates to a process and to a device for moulding frozen confectionary articles, particularly small frozen sticks.

The small, frozen confectionery sticks are manufactured on an industrial scale by means of moulding or by means of extrusion.

When extrusion is employed, the products are manufactured by cutting, into sections, a sausage shape of plastic consistency which is relatively hard at a temperature of the order of −6° C. to −7° C., extruded vertically at the exit from a freezer. Extrusion gives the products a fine, less crystallized texture than that of moulded products. The fine texture obtained by means of extrusion is largely due to the freezing conditions in a freezer and, in particular, to the freezing temperature at the exit from the freezer. That is to say that the lower the temperature the fewer large crystals are formed. This means that the faster the freezing, the smaller the ice crystals and the finer the texture. In a freezer, freezing speed is at its maximum thanks to mixing and to the continual scraping of the wall which allow accelerated freezing of the water. A drawback of this method is that the shape of the extruded products is limited.

The freezing of a liquid composition to be frozen by means of moulding through simple thermal conduction in a mould immersed in a refrigerating solution is slower and leads to the formation of considerably larger crystals. In this process, the composition to be frozen is always metered out in the liquid state into moulds with a view to guaranteeing satisfactory filling and to preventing the creation of air pockets, and its temperature is of the order of −2° C. to −3° C. The proportion of frozen water is low and most of the process of freezing the product takes place in the moulds. This explains the presence of a coarser, more crystallized texture owing to an increase in the size of the crystals.

U.S. Pat. No. 3,632,245, for example, describes an apparatus for manufacturing multi-track short frozen sticks by means of moulding, in which rows of cells are simultaneously filled with a metered quantity of liquid composition to be frozen from distribution hoppers associated with volumetric metering devices comprising cylinders constituting metering chambers in which the liquid is successively aspirated and then expelled by means of metering pistons. After this filling operation, the cells travel in a refrigerating liquid so that the articles are frozen. As the composition to be frozen is liquid, the mere drop in pressure created by the displacement of the piston in its chamber allows perfect filling of the cylinders. Thus, identical filling of the cylinders allows the simultaneous metering of an identical volume into the moulds for all the tracks.

The object of the invention is to provide moulded products of which the quality is similar to that obtained previously in the case only of extruded products.

The invention thus relates to a process for moulding frozen confectionery, in which containers passing through a solidifying environment are filled with a predetermined volume of composition by means of a volumetric metering device connected to a distribution hopper, the said metering device comprising a metering chamber which is filled with composition in the aspiration phase and a metering element which expels the predetermined volume of composition from the chamber in the metering phase, characterized in that a hard composition is metered out whilst being kept under pressure upstream of the metering element and in that the said distribution hopper, which is dept under pressure, allows a continuous supply to the metering chamber so as to fill the moulds without the formation of air pockets.

In the context of the invention, a hard composition is an ice cream which may be frozen cream, a milk ice, a water ice, which may or may not be aerated, and the term "ice cream" used below will refer to such compositions without distinction. A hard ice cream of this type is at −6° C., −7° C. and, in practice, emerges from a freezer. Its texture is firmer than a conventional liquid composition to be frozen and it has a percentage of frozen water relative to the total water of the recipe of 50% or more, particularly 50 to 70%, depending on the composition of the mixture to be frozen. An ice cream of this type may contain inclusions such as, for example, pieces of dried or candied fruit, pieces of jelly or fondant, crunchy pieces, sauce, caramel pieces, or pieces of chocolate or biscuit.

The invention also relates to a device for moulding frozen confectionery articles by filling containers passing through a solidifying environment with a predetermined volume of composition, the said device comprising:
  a distribution hopper containing the composition;
  means for metering the composition which are linked to the hopper, comprising a metering chamber, a metering element, a metering nozzle and a valve communicating either with the hopper and the metering chamber during the aspiration phase or with the metering chamber and the metering nozzle during the filling phase;
  characterized in that the hopper is sealed and non-deformable and in that the device comprises means for maintaining a pressure over the composition during the aspiration phase so as entirely to fill and metering chamber.

The device according to the invention may be applied to any machine for freezing frozen confectionary articles such as, for example
  a machine for freezing in brine, which is rectilinear, rotary, oval or in square movement;
  a freezing machine which uses a liquid, gaseous or evaporating refrigerating fluid, which coats the moulds or sprays them for reasonably long periods;
  a machine in which the moulds are transported by a conveyor in a pulsed-air tunnel to effect fast freezing, it being possible for the conveyor to be rectilinear or to be wound, for example, as a simple or double helix, which is flattened or of revolution;
  any machine of the above type in which the displacement of the moulds is continuous or stepwise.

The device according to the invention may be applied very simply to existing machines by converting the metering devices so as to create an overpressure in the metering hopper, for example, by closing it by means of a lid, by rendering it gas-tight and by connecting it to a source of fluid, particularly of compressed gas, for example of compressed air. This principle of metering under pressure may apply to various types of metering depends such as, for example, metering devices with a dispensing casing and with vertical or horizontal cylinders, metering devices with valves or metering devices with immersed nozzles of the bottom-up-filler and pencil-filler type.

The invention will be described in greater detail by way of illustration with the aid of the appended drawings, in which:

FIG. 1 is a diagrammatic view of the device during the phase of filling the metering chamber;

FIG. 2 is a diagrammatic view of the device of FIG. 1 during the phase of filling a mould;

FIG. 3 is a diagrammatic view of a variant of the device just prior to the filling of a mould;

FIG. 4 is a partial diagrammatic view of the device of FIG. 3 just after the filling of a mould; and FIG. 5 is a partial diagrammatic view of a second variant of the device just after the filling of a mould.

In FIGS. 1 and 2, a pipe 1, side-connected to the hopper 2, feeds the latter with ice cream at −6° C., −7° C. emerging from a freezer. A pipe 3 conveys compressed air into the hopper 2 so as to place it under a pressure of 1.5–2 bar. The pressure in the hopper is regulated by a valve 4 and controlled by a manometer 5. The hopper 2 is closed by a lid 6 and the hopper/lid assembly is non-deformable and preferably gas-tight. The hopper/lid assembly may be, preferably, temperature-controlled. At the bottom of the hopper 2, a pipe 7 delivers the ice cream to the volumetric metering device 8 comprising a hollow body 9 or casing in which a cylindrical valve 10, perforated with as many passages 11 as there are metering tracks (for reasons of clarity, only one track is shown), allows communication either with the hopper 2 or with the metering nozzle 12 by means of the interposition of the strengthened flexible hose 13, by swinging through a quarter of a revolution. The metering device 8 comprises a metering chamber 14 and a metering piston 15. The rotary valve 10 may be replaced by a set of double slide valves, which fulfill the same function but make the metering device bulkier. A mixer 16 force-feeds the pipe 7 communicating with the casing 9. The nozzle 12 is secured to an up-and-down support (not shown), allowing it to descend into the mould 17 and to rise out of the mould 17. The moulds 17 are cooled before and/or after they have been filled by means of a refrigerating vector. Moulding may apply to any mould in one or several parts in contact with any liquid, gaseous or solid refrigerating environment such as, for example, brine, a glycolated water solution, pulsed air, liquid nitrogen or solid carbon dioxide. The nozzle 12 may also be secured under a valve (not shown) which, by closing just after metering, prevents too much of the ice cream being metered out or prevents it dripping owing to the residual volume contains in the flexible hose 13.

In FIG. 1, in a production situation, an empty mould 17, passing stepwise on a conveyor line 18 in the direction of the arrow f1 is presented under the nozzle 12. The latter is made to descend to the bottom of the mould 17 according to f2, whilst the cylinder 14 constituting the metering chamber is filled with composition pushed from the hopper 2 by the compressed air via the pipe 7, then the passage 11 of the valve 10, and the piston 15 rises again according to f3.

As indicated in FIG. 2, the valve 10 swings through a quarter of a revolution, which places the cylinder 14 in communication with the pipe 13 by means of the interposition of the passage 11. The piston 15 descends according to f4 and the precise volume of ice cream contained in the cylinder 14 fills the mould 17 by means of the nozzle 12 which rises progressively according to f5, as filling proceeds.

In FIGS. 3 and 4, the metering principle is the same as that described above, except that the nozzle 19 slides in a dispenser 20 which is integral with the casing 9.

In FIG. 3, the cylinder 14 has been filled with ice cream and this is metered out by the descent of the piston 15 according to f6 via the channel 11 and the window 21 made in the body of the dispenser 20, communicating with the window 22 of the nozzle 19 being presented in the bottom of the mould 17. The nozzle 19 is actuated by a pressure cylinder (not shown), which raises it progressively according to f7 during filling.

After the mould 17 has been filled, as shown in FIG. 4, the valve 10 turns through ¾ of a revolution, which places the cylinder 14 in communication with the pipe 7 connected to the hopper by means of the interposition of the passage 11. The piston 15 is then in a position in which it is ready to aspirate and it rises according to f8.

In this case, dead volumes are minimized and the valve 10 is synchronized with the descent and rise of the nozzle, using an automatic programme.

According to an operational variant, provision may be made for the nozzle to remain stationary and for the mould to be taken by an up-and-down device, i.e. it is lifted at the start of filling and then progressively lowered during filling.

In the variant of FIG. 5, the metering device is provided with a static nozzle 23 placed directly below the casing 9 in straight connection with the cylinder 14. The three-way rotary valve 24 allows communication between the pipe 7 connected to the hopper, the cylinder 14 and the nozzle 23. During filling, the piston 15 descends according to f9 and meters out the ice cream into the mould 17. The nozzle 23 has a narrow opening 25, for example <4 mm in diameter, which allows the ice cream to be made sufficiently fluid by means of shearing and the mould 17 to be filled satisfactorily. In this variant, there is no longer any need for an up-and-down nozzle support and therefore the overall size is minimized.

In an embodiment which is particularly adapted to a multi-track manufacturing line, not shown for reasons of simplification, the hopper, such as 2, which is common to all the tracks, has a generally cylindrical shape, is arranged horizontally, transverse to the tracks, has two ice-cream supply pipes, such as 1, arranged on each side of the cylinder and exit pipes for the ice cream, such as 7, arranged opposite each track. An agitator/distributor, such as 16, comprises a rotary shaft positioned in the axis of the cylinder and blades secured transversely to the said shaft of the agitator, on either side of the said shaft in a position in which they are staggered with respect to one another. The blades are arranged in an offset manner relative to the exit pipes for the ice cream, opposite spaces located on either side of the said exit pipes. The blades preferably have a length such that their end is in the vicinity of the inner wall of the cylinder, a helical shape and an orientation with an angle which, closer to the central part of the cylinder, is increasingly less pronounced, making it possible for the flows of ice cream originating from the supply pipes to be preferentially directed towards the central part of the cylinder so as to offset the preferential flows towards the ends. In this way, the ice cream is distributed homogeneously between the various exit pipes and is able to force-feed the metering chambers without the creation of an air pocket.

During operation, the agitator/distributor is actuated in slow rotation by means of a motor outside the hopper, engaging on the shaft of the agitator, for example a pneumatic motor, and the seal may be provided, for example, by a lip seal on the motor side and by a packing box on the other side of the cylinder. The hopper is fed continuously. If the level of ice cream rises in the hopper, the air pressure increases in its upper part. This increase is pressure, compared with a reference value, may generate a signal which acts on the closure of a valve, such as 4, or on the reduction of the speed of the pump supplying product from the freezer, so as to reduce its rate of flow.

A major advantage of the above cylindrical hopper is that, owing to its geometry, it may be cleaned by chemical agents and, if appropriate, sterilized, for example using hot water or steam, whilst remaining in situ without dismantling.

The advantage provided by the process and the device over traditional moulding means are many:

- it is possible to meter out the ice cream which contains much more water in the frozen state than in the past, with a corresponding improvement in the texture which is that which is usually encountered only in extruded articles, irrespective of the fat content;
- the freezing time may be reduced by 30 to 50%, which allows a greater production rate and improved productivity for the line;
- the viscosity of the ice cream is such that the inclusions it contains, if appropriate, may be distributed in uniform manner without settling as in the case of a liquid metered ice cream;
- it is possible to manufacture composite articles by metering out the ice cream by means of a sheathing nozzle, so as to form a shell which remains in place on the wall of the mould, and it is then possible to fill the centre so as to form a frozen confectionary core of a different type, producing a contrast in texture and/or taste;
- it is possible to manufacture "three-dimensional" or "non-demouldable" articles by using multi-part moulds;
- the articles, being colder, may be more easily coated, for example with a coating which has a fatty composition, with a water ice, with a sorbet or with an emulsion.

The device and the process have been described in connection with the manufacture of frozen lollies. They may, of course, be used to manufacture other moulded articles such as, for example, cones or tubs. The device has been described with reference to the drawings in connection with one metering track for reasons of simplification. Naturally, a machine in a manufacturing situation may comprise up to 20 parallel metering tracks.

What is claimed is:

1. Device for moulding frozen confectionery articles by filling containers passing through a solidifying environment with a predetermined volume of composition, the said device comprising:
   a distribution hopper containing the composition;
   means for metering the composition which are linked to the hopper, comprising a metering chamber, a metering element, a metering nozzle and a valve communicating either with the hopper and the metering chamber during the aspiration phase or with the metering chamber and the metering nozzle during the filling phase;
   characterized in that the hopper is sealed and non-deformable and in that the device comprises means for maintaining a pressure over the composition during the aspiration phase so as entirely to fill the metering chamber.

2. Device according to claim 1, characterized in that the hopper is sealed by a lid and in that the hopper/lid assembly is non-deformable, gas-tight and temperature-controlled.

3. Device according to claim 1, characterized in that the metering nozzle is connected to the valve by means of a flexible hose and in that it is integral with an up-and-down support in such a manner that it descends into the container at the start of filling, rises during filling and re-emerges from the container at the end of filling.

4. Device according to claim 1, characterized in that the valve turns or pivots in a casing and in that the metering nozzle slides in a dispenser which is integral with the casing in such a manner that it descends into the container at the start of filling, rises during filling and re-emerges from the container at the end of filling.

5. Device according to claim 1, characterized in that the valve turns or pivots in the casing, in that the metering nozzle is integral with the casing, in that it is in straight connection with the metering chamber and in that the opening of the nozzle is sufficiently narrow to allow the ice cream to be fluidified by means of shearing.

6. Device according to claim 1, adapted to the metering of ice cream in parallel along several tracks, characterized in that the hopper is of general cylindrical shape, in that it is non-deformable, gas-tight and temperature-controlled and in that it comprises means for homogeneous force-feeding of the metering chambers with the ice cream without the formation of air pockets, particularly an agitator/distributor with oriented blades.

7. Apparatus for preparing frozen ice confectionery articles comprising:
   a pipe for transporting a frozen ice confectionery composition;
   a pipe for conveying a gas compressed to a pressure greater than atmospheric pressure;
   a hopper and lid assembly which is configured for receiving and, in operation, connected to the ice confectionery transport pipe and the compressed air pipe for receiving therein a supply of a frozen ice confectionery composition and compressed gas under a pressure greater than atmospheric pressure and which is configured for passing frozen ice confectionery composition contained therein therefrom and which is sealable gas-tight so that, in operation, ice confectionery contained therein and passed therefrom is maintained under a pressure greater than atmospheric pressure;
   a further pipe connected with the hopper for passing frozen ice confectionery composition from the hopper and lid assembly under a pressure greater than atmospheric pressure;
   a valve connected to the further pipe and a metering device connected to the valve wherein the metering device is configured to define a chamber and comprises a metering element for providing frozen ice confectionery composition into the chamber and for discharging frozen ice confectionery composition introduced into the chamber from the chamber and wherein the valve is configured and positioned for alternately introducing frozen ice confectionery composition from the further pipe into the chamber and discharging frozen ice confectionery composition from the chamber while maintaining the frozen ice confectionery under a pressure greater than atmospheric pressure; and
   a nozzle connected with the valve and adapted for receiving metered frozen ice confectionery composition under a pressure greater than atmospheric pressure that is discharged from the metering device chamber via the valve for dispensing frozen ice confectionery composition under a pressure greater than atmospheric pressure into a container.

8. Apparatus according to claim 7 further comprising a flexible hose connected with the valve and the nozzle for connecting the nozzle with the valve for delivering metered frozen ice confectionery composition from the valve to the nozzle for the dispensing.

9. Apparatus according to claim 8 further comprising a support connected with the hose and nozzle for moving the hose and nozzle towards and away from a container for the dispensing.

10. Apparatus according to claim 7 further comprising a dispenser member connected to the valve for connecting the nozzle with the valve and having a body portion which slideably contains the nozzle and having a second body portion which defines a channel which is connected with the valve for delivering frozen ice confectionery composition from the valve to the nozzle for the dispensing and wherein the slideable nozzle has a window opening for communicating with the dispenser member channel for receiving a metered amount of frozen ice confectionery composition for the dispensing and wherein the dispenser member and slideable nozzle are positioned and the nozzle is slideable for moving towards and away from a container for the dispensing.

11. Apparatus according to claim 7 wherein the nozzle is connected directly to the valve and has a delivery passage having a size so that frozen ice confectionery composition passed therethrough for the dispensing is sheared to fluidize the frozen ice confectionery composition sufficiently for filling the container.

12. Apparatus according to claim 7 wherein the valve is a rotary valve.

13. Apparatus according to claim 7 wherein the valve is a double slide valve.

14. Appararus according to claim 7 further comprising a shaft member from which blade members are contained in the hopper for force-feeding the ice confectionery composition to the valve via the further pipe.

15. Apparatus according to claim 7 wherein the container is a mold.

16. Appararus according to claim 10 further comprising a machine which provides a freezing solidifying environment positioned to contain the mold during the dispensing.

17. Appararus according to claim 7 wherein the hopper has a cylindrical shape.

18. Apparatus according to claim 7, wherein the pipe for transporting and the pipe for conveying are different pipes.

19. Apparatus according to claim 7, wherein the pipes, hopper and lid assembly, metering device, valve, and nozzle are adapted for pressurizing the gas to 1.5 bar to 2 bar.

20. A device for molding frozen confectionery articles by filling containers passing through a solidifying environment with a predetermined volume of composition, the device comprising:

a distribution hopper containing the composition;

means for metering the composition which are linked to the hopper, comprising a metering chamber, a metering element, a metering nozzle, and a valve communicating either with the hopper and the metering chamber during the aspiration phase or with the metering chamber and the metering nozzle during the filling phase;

wherein characterized the hopper is sealed and non-deformable and the device comprises means for maintaining a pressure over the composition during the aspiration phase so as to entirely fill the metering chamber.

21. The device according to claim 20, wherein the hopper is sealed by a lid and in that the hopper/lid assembly is non-deformable, gas-tight, and temperature-controlled.

22. The device according to claim 20, wherein the metering nozzle is connected to the valve by means of a flexible hose and is integral with an up-and-down support in such a manner that it descends into the container at the start of filling, rises during filling and re-emerges from the container at the end of filling.

23. The device according to claim 20, wherein the valve turns or pivots in a casing and the metering nozzle slides in a dispenser which is integral with the casing in such a manner that it descends into the container at the start of filling, rises during filling, and re-emerges from the container at the end of filling.

24. The device according to claim 20, wherein the valve turns or pivots in the casing, the metering nozzle is integral with the casing, and is in straight connection with the metering chamber and the opening of the nozzle is sufficiently narrow to allow the ice cream to be fluidified by means of shearing.

25. The device according to claim 20, adapted to the metering of ice cream in parallel along several tracks, wherein the hopper is of cylindrical shape, is non-deformable, gas-tight, and temperature-controlled, and it comprises means for homogeneous force-feeding of the metering chambers with the ice cream without the formation of air pockets, particularly an agitator/distributor with oriented blades.

* * * * *

UNITED STATES PATENT AND TRADEMARK OFFICE
CERTIFICATE OF CORRECTION

PATENT NO.         : 6,543,248 B2
APPLICATION NO. : 09/796573
DATED                 : April 8, 2003
INVENTOR(S)       : Cathenaut et al.

It is certified that error appears in the above-identified patent and that said Letters Patent is hereby corrected as shown below:

Title Page:
"(62)", Related U.S. Application Data, delete "now abandoned" and insert --now Pat. No. 6,534,106 B2--.

"(56) References Cited" under the heading "U.S. PATENT DOCUMENTS", please add the following references:

| | | | |
|---|---|---|---|
| -- 1,685,460 | 09/1928 | Myers et al. | |
| 1,693,988 | 12/1928 | Kuhn | |
| 3,166,025 | 01/1965 | Hulse | |
| 4,346,120 | 08/1982 | Morely et al. | 426/565 |
| 4,746,523 | 05/1988 | Binley | 426/249 |
| 4,916,920 | 04/1990 | Weis et al. | 62/342 |
| 5,069,364 | 12/1991 | McGill | 222/95 |
| 5,435,143 | 07/1995 | Heinrich | 62/75 |
| 5,758,571 | 06/1998 | Kateman et al. | 99/455 |
| 5,894,030 | 04/1999 | Gibson et al. | 426/524 |
| 5,948,456 | 09/1999 | Jones et al. | 426/100 |
| 6,187,365 | 02/2001 | Vaghela et al. | 426/565-- |

"(56) References Cited", please insert the following heading and references:
--FOREIGN REFERENCES--

| | | |
|---|---|---|
| -- GB | 992262 | 06/1962 |
| GB | 2230057 | 10/1990 |
| WO | 98/05096 | 06/1989 |
| WO | 95/16134 | 06/1995 -- |

"(57) ABSTRACT", please delete the abstract text and substitute therefor:
--Apparatus for preparing frozen ice confectionery articles has a pipe for transporting a frozen ice confectionery composition, a pipe for conveying a gas compressed to a pressure greater than atmospheric pressure and a hopper and lid assembly which is configured for receiving and, in operation, connected to the two pipes for receiving therein a supply of a frozen ice confectionery composition and a compressed gas under a pressure greater than atmospheric pressure and which is configured for passing frozen ice confectionery composition therefrom and which is sealable gas-tight to that, in operation, frozen ice confectionery composition contained therein and passed therefrom is maintained under a pressure greater than atmospheric pressure. A further pipe is connected with the hopper and lid assembly for passing the frozen composition from the assembly to a valve and a metering device, and then from the metering device, metered amounts are delivered to a nozzle for dispensing the composition, the valve being configured and positioned for alternately introducing composition into the metering device and then metered amounts from the metering device to the dispensing nozzle.--.

UNITED STATES PATENT AND TRADEMARK OFFICE
CERTIFICATE OF CORRECTION

PATENT NO. : 6,543,248 B2
APPLICATION NO. : 09/796573
DATED : April 8, 2003
INVENTOR(S) : Cathenaut et al.

It is certified that error appears in the above-identified patent and that said Letters Patent is hereby corrected as shown below:

Column 1:
After the title and before the first line of text, insert the following heading:
--CROSS-REFERENCE TO RELATED APPLICATION--.
Between lines 6 and 7, insert the following heading and text:

--The present invention relates to preparation of frozen confectionery articles and more particularly to apparatus for preparing the articles with a moulding procedure and more particularly to apparatus for delivering a confectionery substance to moulds for moulding into frozen articles.--.
Delete the text at lines 7-9.
Line 10, delete "The small," and insert --Small--.
Lines 13-14, after "When extrusion is employed," delete "the products are manufactured by cutting, into sections,".

Line 15, change "consistency which" to --consistency, which--.
Line 16, after "-7°C.," insert --is--.
Line 17, after "a freezer" and before the period, insert --and then cut into sections--.
Line 21, after "That is to say" insert --,-- and delete "that".
Line 22, after "temperature" insert --,-- and delete "the".
Line 42, delete "manufacturing" and after "multi-track" insert --manufacturing--.
Line 56, after "The object of the" insert --present--.
Line 58, after "products" and before the period, insert --by metering a hard ice confectionery composition under a pressure greater than atmospheric pressure into a mold--.
Line 59, after "The invention thus", delete "relates to" and insert --provides--.
Line 60, after "confectionery" delete ",".
Line 63, delete "said".
Line 67, after "metering phase," insert --and which is--.

Column 2:
Line 1, after "hard" insert --ice confectionery--.
Line 3, delete "said".
Delete lines 6-35 and insert the following:

UNITED STATES PATENT AND TRADEMARK OFFICE
CERTIFICATE OF CORRECTION

PATENT NO.        : 6,543,248 B2                                         Page 3 of 5
APPLICATION NO.   : 09/796573
DATED             : April 8, 2003
INVENTOR(S)       : Cathenaut et al.

It is certified that error appears in the above-identified patent and that said Letters Patent is hereby corrected as shown below:

Column 2 (continued):
--Further to the ends of preparing the product and carrying out the process of the present invention, the present invention also provides apparatus which comprises a sealed distribution hopper for containing a composition to be filled in a container under a pressure greater than atmospheric pressure, means linked to the hopper for metering the composition which comprise a metering chamber, a metering element, a metering nozzle and a valve alternately communicating with the hopper and the metering chamber during the aspiration phase and with the metering chamber and a metering nozzle during the filling phase, and means for maintaining a pressure over the composition during the aspiration phase so as entirely to fill the metering chamber.--
--In the context of the present invention, a hard ice confectionery composition is an ice cream, which may be frozen cream, a milk ice, or a water ice, which may or may not be aerated, and the term "hard ice confectionery composition" is used below to refer to such compositions without distinction. In the present invention, the hard ice confectionery ice composition is prepared in and emerges from a freezer at a temperature of from -6°C to -7°C. Its texture is firmer than a conventional liquid composition to be frozen and it has a percentage of frozen water relative to the total water of the recipe of 50% or more, particularly 50 to 70%, depending on the composition of the mixture to be frozen. The hard confectionery composition, particularly an ice cream, may contain inclusions such as, for example, pieces of dried or candied fruit, pieces of jelly or fondant, crunchy pieces, sauce, caramel pieces, or pieces of chocolate or biscuit.--
Line 36, after "The" insert --apparatus--.
Line 38, change "for example" to --for example:--.
Line 48, after "revolution;" insert --or--.
Line 51, delete "according to the invention".
Line 53, delete "as to create" and insert therefor --that--, and after "overpressure" insert --is created--.
Line 56, after "particularly", delete "of" and insert therefor --a--, and change "for example of" to --for example, a--.
Delete lines 63-65 and insert therefor the following text:
--The invention is described in greater detail by way of illustration with the aid of the accompanying drawings.--.
Line 67, change "metering chamber:" to --metering chamber.--.

UNITED STATES PATENT AND TRADEMARK OFFICE
CERTIFICATE OF CORRECTION

PATENT NO. : 6,543,248 B2
APPLICATION NO. : 09/796573
DATED : April 8, 2003
INVENTOR(S) : Cathenaut et al.

It is certified that error appears in the above-identified patent and that said Letters Patent is hereby corrected as shown below:

Column 3:
Line 2, change "mould;" to --mould.--.
Line 4, change "mould;" to --mould.--.
Line 6, change "mould; and" to --mould.--.
Line 10, change "at -6°C., -7°C." to -- at -6°C. to -7°C.--.
Line 19, change "comprising" to --which comprises--.
Line 23, delete "either", and change "hopper 2 or" to --hopper 2 and--.
Line 32, change "mould" to --moulds--.
Line 33, change "mould" to --moulds--.
Line 52, change "swings" to --has swung--.
Line 62, before "dispenser 20" insert --portion of the body of--.
Line 63, delete "has been filled" and insert --provides for metering the ice confectionery composition by the descent--.
Line 66, delete "the body" and insert --second body portion--, and after "dispenser 20," insert --when--.
Line 67, after "nozzle 19" insert --illustrated as--.

Column 4:
Line 31, change "simplification, the" to --simplification, a--.
Line 32, change "the track," to --the track and--.

Column 5:
Line 5, change "the ice cream" to --an ice confectionery composition--.
Line 8, delete "that which is".
Line 21, delete "as to form", and insert --that--.
Line 22, change "type," to --type is formed thereby--.
Line 24, after "moulds;" insert --and--.
Delete lines 37-67 (claims 1-4).

Column 6:
Delete lines 1-14 (claims 5-6).
Line 15, change "7" to --1--.
Line 57, change "8" to --2-- and change "7" to --1--.
Line 62, change "9" to --3-- and change "8" to --2--.
Line 66, change "10" to --4-- and change "7" to --1--.

UNITED STATES PATENT AND TRADEMARK OFFICE
CERTIFICATE OF CORRECTION

PATENT NO. : 6,543,248 B2
APPLICATION NO. : 09/796573
DATED : April 8, 2003
INVENTOR(S) : Cathenaut et al.

It is certified that error appears in the above-identified patent and that said Letters Patent is hereby corrected as shown below:

Column 7:
Line 13, change "11" to --5-- and change "7" to --1--.
Line 19, change "12" to --6-- and change "7" to --1--.
Line 21, change "13" to --7-- and change "7" to --1--.
Line 23, change "14" to --8--, change "Appararus" to --Apparatus--, and change "7" to --1--.
Line 27, change "15" to --9-- and change "7" to --1--.
Line 29, change "16" to --10--, change "Appararus" to --Apparatus-- and change "10" to --9--.
Line 32, change "17" to --11-- and change "7" to --1--.
Line 34, change "18" to --12-- and change "7" to --1--.
Line 36, change "19" to --13-- and change "7" to --1--.
Line 39, change "20" to --14--.

Column 8:
Line 13, change "21" to --15-- and change "20" to --14--.
Line 16, change "22" to --16-- and change "20" to --14--.
Line 22, change "23" to --17-- and change "20" to --14--.
Line 28, change "24" to --18-- and change "20" to --14--.
Line 34, change "25" to --19-- and change "20" to --14--.

Signed and Sealed this

Second Day of January, 2007

JON W. DUDAS
*Director of the United States Patent and Trademark Office*